INVENTOR.
N.R. WILSON

BY *Young and Quigg*

ATTORNEYS 3,608,137
NONPARALLEL LAND DIE
Newton R. Wilson, Bartlesville, Okla., assignor to
Phillips Petroleum Company
Filed Apr. 9, 1969, Ser. No. 814,678
Int. Cl. B29d 23/04
U.S. Cl. 18—14G   2 Claims

ABSTRACT OF THE DISCLOSURE

An extrusion die for use in a blow molding apparatus. The die is in the form of a diverging annular opening defined by a pair of nonparallel land areas.

---

This invention relates to blow molding. In one aspect it relates to a new and improved design for dies used in blow molding The typical blow molding technique involves extruding a plasticized resin of thermoplastic material through an annular die forming a tube (parison); closing a mold over the parison; expanding the parison into conformance with the configuration of the mold; and ejecting the finished product after the parison has reached a set temperature. Blow molding finds particular application in the manufacture of containers such as bottles, tanks, and the like. While a variety of thermoplastic materials can be blow molded, a resin of high density polyethylene is generally used.

Blow molding equipment for carrying out the process described above generally comprises an extruder, a die, and a set of molds. The present invention is directed specifically at an improved design for dies used in the typical blow molding system. While die designs are many and varied, a particularly useful configuration of the die opening has been the diverging annular passage, defined on one side by a die bushing, and on the other by a movable mandrel. The vertically movable mandrel offers convenient means for adjusting the annular passage for controlling the distribution of the parison wall thickness. Generally the frustoconical land areas of the bushing and mandrel are disposed parallel and, in combination, define a diverging annular passage characterized as having an increasing flow area from the inlet to the outlet. Since the polymer shear rate for annular slits at the die walls is inversely proportional to the product of the slit width and the slit thickness, it is apparent that the shear rate through the passage is nonuniform, being maximum at the inlet and minimum at the outlet.

Surprisingly, it has been found that by designing a die to provide for a uniform shear rate through the annular passage or to locate the maximum shear rate at the die outlet, the quality of the parison is improved and the machine output at a given melt pressure is increased. The main improvement in parison quality results from a decided reduction in melt instability resulting from erratic flow conditions that are shear dependent. The increased output at a given melt pressure can be utilized to reduce machine power requirements or enhance pressure programming capabilities without the need for increased power in the hydraulic ram system.

Figure 2:
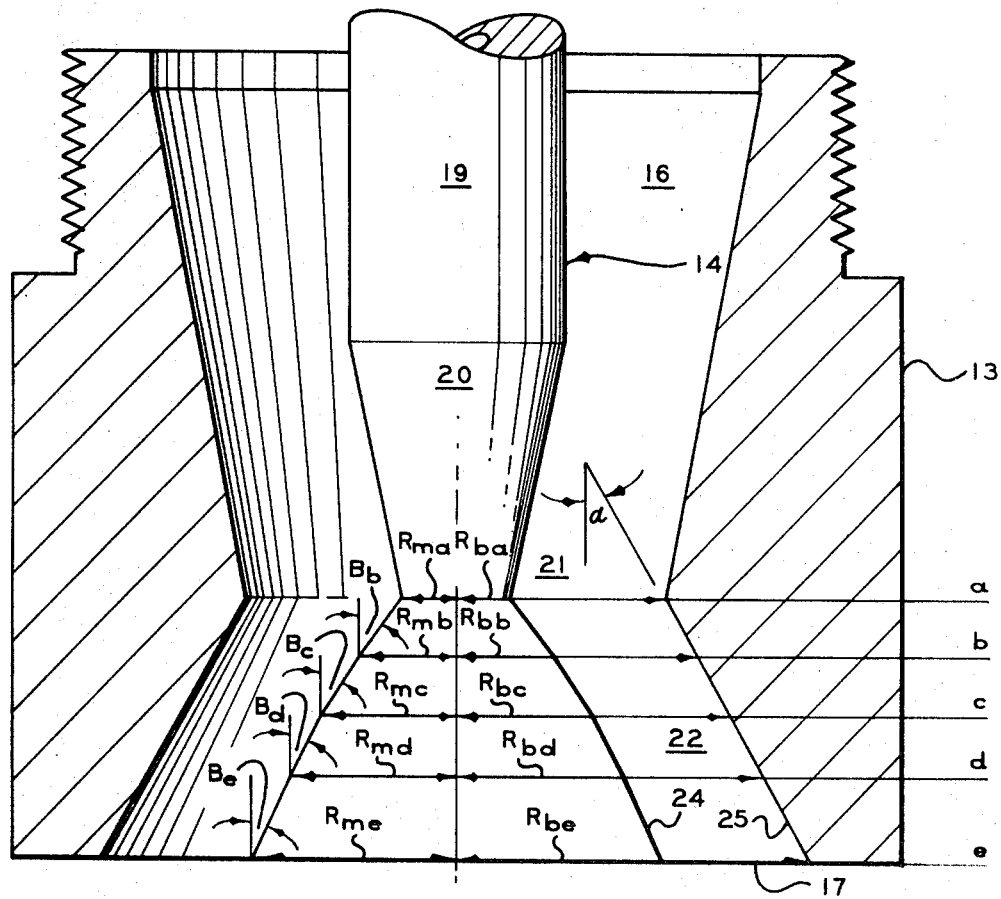
Figure 1:
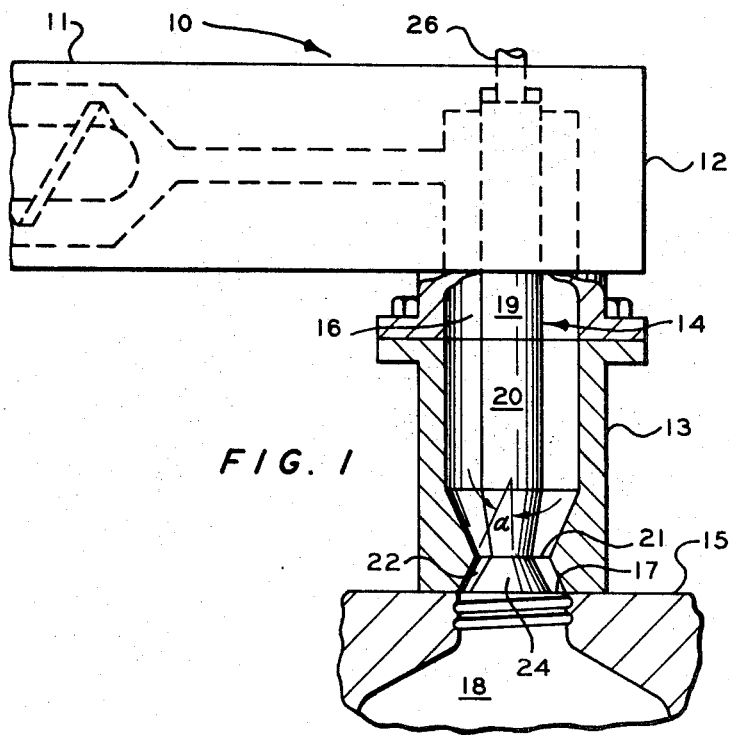

It is therefore an object of the present invention to provide a blow molding die particularly configurated so as to provide for a near constant resin shear rate therethrough. Another object of this invention is to provide a blow molding die with a land section wherein shear rate therethrough is uniform within practical limits. These and other objects will become apparent to those skilled in the art from the following disclosure taken in conjunction with the attached drawings in which:

FIG. 1 is a sectional view of a blow molding apparatus incorporating the novel die of this invention; and FIG. 2 is an enlarged sectional view of a die for use in the apparatus shown in FIG. 1 and provided with a different land configuration shown therein.

As shown in FIG. 1, a blow molding apparatus 10 includes an extruder 11, a die head 12, a die bushing 13 bolted to the head 12, a mandrel 14, and a mold 15. The die head 12 and bushing 13 are provided with internally aligned passages which in combination with the mandrel 14 define an annular passage 16 therethrough. The outlet 17 of the annular passage 16 registers with the cavity 18 of mold 15. In practice, then, the extruder 11 forces the molten resin through the annular passage 16, discharging it from end 17 in the form of a hollow tube or parison. The mandrel 14 has a body portion 19 and an extension 20 threadedly connected to the portion 19. The annular passage 16 defined by the bushing 13 and extension 20 includes a converging entry portion 21 and a diverging land portion 22. The flow area through the entry portion 21 is generally large relative the land portion 22 so that little shear occurs therein. However, the bushing 13 and mandrel extension 20 which define the land portion 22 are configurated to present a continuously decreasing flow area therethrough. More specifically, the mandrel extension 20 is configurated to provide a frustoconical section the periphery of which constitutes the internal land area 24 for passage portion 22. The bushing 13 is provided with an internal frustoconical surface which provides the outer land area 25 for passage portion 22. Conventionally, the bushing land area 25 and the mandrel land area 24 are arranged parallel, the annular flow area of portion 22 defined thereby increasing uniformly towards the outlet. In such an arrangement, as indicated previously, maximum shear rate occurs at the inlet of the land portion 22. In accordance with the principles of the invention, the mandrel land area 24 is configurated in relation to the bushing land area 25 to provide an annular flow area through the land portion 22 which provides for a near constant shear rate therethrough.

The diameters of the land areas 24 and 25 are sized at longitudinally spaced points, $a$, $b$, $c$, $d$, and $e$ (see FIG. 2), through portion 22 according to the following formula:

$$\text{Apparent Shear Rate}^1 = \frac{cQ}{wh^2}$$

or $$\text{Apparent Shear Rate}^2 = \frac{2(n+2)Q}{\pi(R_b+R_m)(R_b-R_m)^2}$$

where $c$ = constant, for annular slit $c = 5.58$
$w$ = the annular passage width (effective annular width of annular slit, $$\frac{2R_b + 2R_m}{2}$$

$h$ = the annular passage thickness $(R_b - R_m)$
$n$ = non-Newtonian flow factor
$Q$ = volumetric flow rate
$R_b$ = radius of bushing land area
$R_m$ = radius of mandrel land area

[1] Presented in SPE Journal, September 1963.
[2] Presented in SPE Journal, July 1963.

Now, for a given flow rate $Q$, the dimensions ($R_b$ and $R_m$) of the bushing land area 25 and mandrel land area may be sized to provide a constant shear rate. For example, if the angle of taper $\alpha$ of the bushing land area 25 is set at 30°, and longitudinal points $a$, $b$, $c$, $d$, $e$ are selected, the radii ($R_m$) of the mandrel land area 24 determined as a function of bushing land area radii ($R_b$) would be as follows (see FIG. 2):

| Longitudinal point | $R_m$ | $R_b$ | β | Distance between points | $R_m - R_b$ |
|---|---|---|---|---|---|
| a | 0.188 | .241 | | | 0.053 |
| b | 0.308 | .349 | 31°45' | 0.196 | 0.041 |
| c | 0.430 | .465 | 31°10' | 0.200 | 0.035 |
| d | 0.548 | .580 | 30°45' | 0.200 | 0.032 |
| e | 0.725 | .753 | 30°30' | 0.300 | 0.028 |

The configuration of the mandrel land area 24 in relation to the bushing land area 25 according to the dimensions indicated in the above table provides for a near constant shear rate through the land portion 22. It should be observed that this relationship, e.g., constant shear rate, may also be obtained by tapering the mandrel land area at a constant rate and varying the taper of the bushing land area according to the same formulas.

The partitioning of the bushing land area 24 along its axis, e.g., longitudinal points a, b, c . . . , to determine the specific diameters and tapers at the selected points is an idealized approach for providing a constant shear rate. However, the precision machining required to configurate the mandrel limits somewhat its practical application. In appreciation of these practical considerations, the present invention also includes a simplified configuration which provides the constant shear rate in the land portion 22 within practical limits. As shown in FIG. 1, the bushing land area 25 tapers radially outwardly at an angle α relative to the axis. The mandrel land area 24 tapers uniformly radially outwardly relative to its axis, the degree of taper being from 1½ to 3° greater than the taper for the bushing land area 25, thus providing a passage portion 22 having converging land areas. It has been found from practice that this relationship provides for a generally uniform shear rate in portion 22. While the taper of angle α is not critical, preferably it should be in the range from about 10° to about 40°, and more preferably from about 25° to about 35°, the taper of mandrel land area being about 1½° to about 3° greater than α. The cited ranges of the taper angle α enable a standard extrusion head to be used with different bushings to vary the parison diameter.

The upper portion of the mandrel 14 is provided with a stem 26 which is operatively connected to mechanical means (not shown) for reciprocating the mandrel 14 thereby providing means for controlling parison wall thickness. A conventional blow tube (not shown) provides means for blowing the parison outwardly against the mold walls.

The following examples compare the performance of the conventional parallel land dies with the nonparallel land die constructed according to this invention.

EXAMPLE I

A resin of linear polyethylene having a nominal 0.960 g./cc. density (ASTM D 1505-63T) and a nominal melt index of 0.6 (ASTM D 1238-62T, Condition "E") was extruded by use of a 2010 Uniloy reciprocating screw (single head) blow molder through a die configurated as indicated below and at conditions indicated below:

PARALLEL LAND DIE

[Land areas tapering radially outwardly at 30°]

| | Die opening ($R_b - R_m$), mils | | |
|---|---|---|---|
| | 28 | 50 | 70 |
| Melt temperature, °F | 365 | 365 | 365 |
| Parison weight, gms | 113.6 | 188.7 | 256.9 |
| Drop time, sec | 1.5 | 1.3 | 2.1 |
| Hydraulic pressure, p.s.i | 1,000 | 1,000 | 1,000 |

EXAMPLE II

A resin of linear polyethylene having a nominal 0.960 g./cc. density (ASTM D 1505-63T) and a nominal melt index of 0.6 (ASTM D 1238-62T, Condition "E") was extruded by use of a 2010 Uniloy reciprocating screw (single head) blow molder through a die configurated as indicated below and at conditions indicated below:

NONPARALLEL LAND DIE

[Bushing land and mandrel land tapering radially outwardly at about 30° and 33°, respectively]

| | Die opening at outlet (inlet), mils | | |
|---|---|---|---|
| | 28(53) | 50(69) | 70(89) |
| Melt temperature, °F | 365 | 365 | 365 |
| Parison weight, gms | 142.1 | 208.3 | 264.3 |
| Drop time, sec | 1.1 | 1.7 | 2.1 |
| Hydraulic pressure, p.s.i | 1,000 | 1,000 | 1,000 |

As reflected by the above examples, the nonparallel land die (Example II) provides for a greater parison wall thickness at a faster drop time, particularly for the smaller die openings.

EXAMPLES III, IV, V

A resin of linear polyethylene having a nominal 0.960 g./cc. density (ASTM D 1505-63T) and a nominal melt index of 0.6 (ASTM D 1238 62T, Condition E) was extruded from a single head Producto blow molder attached to a 2½" NRM extruder through the dies configurated and at conditions indicated below.

EXAMPLE III.—PARALLEL LAND DIE

[Land areas tapering outwardly at 30°; 25 mil lip opening]

| | Run | | | |
|---|---|---|---|---|
| | 1 | 2 | 3 | 4 |
| Melt temperature, °F | 380 | 380 | 380 | 380 |
| Parison weight, gms./in | 7.7 | 8.6 | 9.2 | 10.3 |
| Drop time, sec | 6.2 | 3.5 | 2.1 | 1.2 |
| Parison weight/drop time | 1.3 | 2.5 | 4.4 | 8.6 |
| Hydraulic pressure, p.s.i | 800 | 1,000 | 1,200 | 1,400 |

EXAMPLE IV.—NONPARALLEL LAND DIE

[Bushing land and mandrel land tapering radially outwardly at about 30° and 33°, respectively; lip opening of 25 mils]

| | Run | | | |
|---|---|---|---|---|
| | 1 | 2 | 3 | 4 |
| Melt temperature, °F | 380 | 380 | 380 | 380 |
| Parison weight, gms./in | 11.4 | 12.6 | 14.1 | 14.9 |
| Drop time, sec | 6.1 | 3.5 | 2.1 | 1.5 |
| Parison weight/drop time | 1.9 | 3.6 | 6.7 | 9.9 |
| Hydraulic pressure, p.s.i | 800 | 1,000 | 1,200 | 1,400 |

EXAMPLE V.—NONPARALLEL LAND DIE

[Bushing land tapering at 30° and mandrel land configurated as shown in FIG. 2, lip opening of 25 mils]

| | Run | | | |
|---|---|---|---|---|
| | 1 | 2 | 3 | 4 |
| Melt temperature, °F | 380 | 380 | 380 | 380 |
| Parison weight, gms./in | 8.3 | 9.3 | 11.4 | 12.7 |
| Drop time, sec | 8.0 | 4.0 | 1.6 | 1.2 |
| Parison weight/drop time | 1.04 | 2.3 | 7.1 | 10.6 |
| Hydraulic pressure, p.s.i | 800 | 1,000 | 1,300 | 1,500 |

By comparing the parison weight/drop time of Examples III, IV and V, it is seen that the rate of extrusion is significantly faster in the nonparallel land dies at substantially identical operating conditions. Thus, the more uniform shear rate provided by the nonparallel die (Examples II, IV and V) results in less total shear of the melt. With the conventional parallel die, it is possible that melt fracture might occur for particular resins having desirable properties such as impact resistance, stress cracking resistance. However, for the nonparallel die constructed according to this invention, the probabilities of melt fracturing occurring are reduced because the total shear stress for the same melt throughput is substantially less than that required for the conventional parallel die.

It should be observed that at the higher extrusion rates, runs 3 and 4, the nonparallel land die (Example IV) having converging lands and which has been described as the practical approach in providing nearly constant shear rate, provides for a shear rate approaching that of the idealized die (Example V).

While the preferred embodiment of this invention has been described in particular detail, it should be emphasized that variations and modifications can be made therein without departing from the scope and spirit of the invention as set forth in the appended claims.

That which is claimed is:

1. In an apparatus for blow molding thermoplastic material, a parison extrusion die comprising:

a bushing having an internal land area defining an internal opening therethrough, said internal land area tapering continuously, substantially uniformly outwardly from one of its ends to its other end relative to and along an axis of the bushing opening at an angle in the range of from about 10° to about 50°; and a mandrel having an axis, an external land area, and a plurality of different radii extending perpendicularly from said mandrel axis at spaced points therealong, said mandrel being positioned coaxially to extend within said internal opening with said mandrel land area in cooperation with said bushing land area to define a continuously tapered annular passage having an inlet and an outlet with said annular passage diverging from the axis in a direction from the inlet to the outlet of the annular passage, said mandrel land area being of a configuration relative to the land area of the bushing such that, at each of the plurality of spaced points, the product of the expression $$(R_b+R_m)(R_m-R_b)^2$$

where
$Rb$ = the distance between the axis and the bushing land area as measured along one of the radii and
$Rm$ = the distance between the axis and the mandrel land area as measured along the radii of the corresponding $Rb$ is substantially equal to a constant K where $$K=(Q)(c)/S$$

$Q$ = a preselected thermoplastic material flow rate
$S$ = a preselected shear rate
$c$ = a constant thereby providing a parison extrusion die having a substantially constant shear rate for a preselected thermoplastic material flowing through the annular passage at a preselected rate.

2. In an apparatus for blow molding thermoplastic material, a parison extrusion die comprising:

a mandrel having axis, an external land area tapering continuously, substantially uniformly outwardly from one of its ends to its other end relative to and along the axis at an angle in the range of from about 10° to about 40°; and a bushing having an axis, internal land area defining an internal opening therethrough with said mandrel being coaxially positioned within said opening, and a plurality of different radii extending perpendicularly from said axis at spaced points therealong, said bushing land area in cooperation with said mandrel land area defining a continuously tapered annular passage having an inlet and an outlet with said annular passage diverging from the axis in a direction from the inlet to the outlet of the annular passage, said bushing land area being of a configuration relative to the land area of the mandrel such that, at each of the plurality of spaced points, the product of the expression $$(R_b+R_m)(R_m-R_b)^2$$

where
$Rb$ = the distance between the axis and the bushing land area as measured along one of the radii and
$Rm$ = the distance between the axis and the mandrel land area as measured along the radii of the corresponding $Rb$ is substantially equal to a constant K where $$K=(Q)(c)/S$$

$Q$ = a preselected thermoplastic material flow rate
$S$ = a preselected shear rate
$c$ = a constant thereby providing a parison extrusion die having a substantially constant shear rate for a preselected thermoplastic material flowing through the annular passage at a preselected rate.

References Cited
UNITED STATES PATENTS

| | | | |
|---|---|---|---|
| 3,281,896 | 11/1966 | Meyer et al. | 18—14V |
| 3,308,509 | 3/1967 | Hsia | 18—14G |

J. SPENCER OVERHOLSER, Primary Examiner

L. R. FRYE, Assistant Examiner

U.S. Cl. X.R.
264—209

UNITED STATES PATENT OFFICE

CERTIFICATE OF CORRECTION

Patent No. 3,608,137                       Dated: September 28, 19'

Newton R. Wilson

It is certified that error appears in the above-identified patent and that sa Letters Patent are hereby corrected as shown below:

Claim 1, column 5, line 16, "50°" should read — 40° —.

Signed and sealed this 28th day of March 1972.

(SEAL)
Attest:

EDWARD M. FLETCHER, JR.           ROBERT GOTTSCHALK
Attesting Officer                    Commissioner of Patents